UNITED STATES PATENT OFFICE.

CHARLES O. KANOUSE, OF NEWARK, NEW JERSEY, ASSIGNOR TO ALBERT THALHEIMER, OF SAME PLACE.

MANUFACTURE OF PLASTIC COMPOSITION FROM SOLUBLE FIBER.

SPECIFICATION forming part of Letters Patent No. 247,734, dated September 27, 1881.

Application filed January 8, 1881. (No specimens.)

*To all whom it may concern:*

Be it known that I, CHARLES O. KANOUSE, a citizen of the United States, residing in Newark, Essex county, New Jersey, have invented an Improvement in the Manufacture of Plastic Composition from Soluble Fiber, of which the following is a specification.

My invention consists in treating soluble gun-cotton or other soluble fibrous material while heated with a volatile liquid solvent, in the manner and for the purpose fully explained hereinafter.

In carrying my invention into effect I use soluble cotton, or any other fibrous material which has been rendered soluble by the usual acid treatment, and place it in an open vessel, which is maintained at a temperature of about 100° Fahrenheit. After the soluble cotton or other soluble fiber has become heated I pour on it volatile liquid solvent in sufficient quantity to thoroughly saturate it, at the same time adding powdered coloring-matter to impart any desired tint to the product. While the mass is in a heated condition I mix it thoroughly until the cotton or other fiber is entirely dissolved and the mass becomes homogeneous and plastic. After this the mass is removed from the vessel and subjected to the action of rolls to render it hard and compact and ready for the market. This last branch of the process, however, forms no part of my present invention, as it has heretofore been practiced in the manufacture of celluloid, rubber, and other compositions.

By applying the volatile liquid solvent under heat I attain several objects: First, the solvent acts more promptly under the influence of heat than when applied to the fiber while the latter is in a cold state, a saving of ten hours in the duration of the process being effected by my improvement; secondly, my invention effects a saving of about (50) fifty per cent. of the solvent; thirdly, while the heat of the fiber tends to evaporate the volatile solvent, the evaporation takes place while the solvent is in contact with the fiber and intimately mixed therewith; hence the prompt dissolving action and the evaporation is advantageous, for it lessens the difficulty of subsequently removing the solvent from the composition, which, moreover, is more easily dried after my treatment than after the old process of dissolving the fiber while it is in a cold state.

Various kinds of vessels may be employed in carrying my invention into effect; but I prefer to use a jacketed vessel, hot water or steam being allowed to circulate within this jacket.

The solvent may consist of alcohol and camphor, as generally used in the manufacture of celluloid.

Other ingredients—such as baryta, zinc-white, or shellac—may be added to the composition in the heated vessel, as the desired character of said composition may suggest.

I claim as my invention—

In the manufacture of plastic material from cotton or other soluble fibrous material, the within-described process of applying a volatile solvent to and intimately mixing it with the said material while the latter is in a heated state in an open vessel, substantially as set forth.

In testimony whereof I have signed my name to this specification in the presence of two subscribing witnesses.

CHARLES O. KANOUSE.

Witnesses:
JAMES T. TOBIN,
HARRY SMITH.